United States Patent
Suchecki

(10) Patent No.: US 8,142,313 B2
(45) Date of Patent: Mar. 27, 2012

(54) HYDRAULIC TENSIONER WITH OVERTRAVEL LIMITER

(75) Inventor: Tom Suchecki, Sterling Heights, MI (US)

(73) Assignee: Ford Global Technologies, Dearborn, MI (US)

( * ) Notice: Subject to any disclaimer, the term of this patent is extended or adjusted under 35 U.S.C. 154(b) by 518 days.

(21) Appl. No.: 12/348,948

(22) Filed: Jan. 6, 2009

(65) Prior Publication Data

US 2010/0173735 A1 Jul. 8, 2010

(51) Int. Cl.
*F16H 7/08* (2006.01)
(52) U.S. Cl. ........................ 474/109; 474/111
(58) Field of Classification Search .................. 474/101, 474/109, 110, 111, 140
See application file for complete search history.

(56) References Cited

U.S. PATENT DOCUMENTS

| | | | | |
|---|---|---|---|---|
| 4,874,352 | A | * | 10/1989 | Suzuki ............................ 474/110 |
| 5,366,415 | A | | 11/1994 | Church et al. |
| 5,577,970 | A | * | 11/1996 | Smith et al. .................... 474/110 |
| 5,624,352 | A | | 4/1997 | Smale |
| 5,718,650 | A | * | 2/1998 | Smith et al. .................... 474/110 |
| 6,196,939 | B1 | * | 3/2001 | Simpson ........................ 474/110 |
| 6,422,962 | B1 | | 7/2002 | Lehtovaara et al. |
| 6,767,302 | B2 | | 7/2004 | Seungpyo |
| 2005/0090342 | A1 | | 4/2005 | Yoshida |
| 2006/0194661 | A1 | | 8/2006 | Hayami et al. |
| 2010/0022339 | A1 | * | 1/2010 | Barve ............................. 474/111 |
| 2010/0029425 | A1 | * | 2/2010 | Lee ................................ 474/111 |

FOREIGN PATENT DOCUMENTS

JP 2003120766 A 4/2003

* cited by examiner

*Primary Examiner* — William E Dondero
(74) *Attorney, Agent, or Firm* — Jerome R. Drouillard; Julia Voutyras

(57) ABSTRACT

A hydraulic tensioner for a drive system, including a flexible, inextensible drive element, has a bi-directional travel limiter associated with a hydraulically biased tensioning cylinder. The travel limiter is bi-directional because it limits not only loading of the tensioning cylinder against a tensioner shoe in a direction tending to tighten a drive element, but also resists movement of the tensioner shoe in a direction tending to allow slack in a drive element.

20 Claims, 4 Drawing Sheets

HYDRAULIC TENSIONER WITH OVERTRAVEL LIMITER

BACKGROUND OF THE INVENTION

1. Field of the Invention

The present invention relates to a tensioning device for maintaining desired tightness within a flexible inextensible drive element in a system such as a camshaft drive for an internal combustion engine.

2. Disclosure Information

Devices incorporating flexible inextensible drive elements such as fiber-reinforced belts or metal linked chains have traditionally employed tensioning devices. In order to be effective, such devices must damp excess motion of the chain or belt without imposing unreasonably high hub loads upon either the driving member, such as a crankshaft of an engine, or other driven members such as idlers or camshafts. Unfortunately, if tension is not adequate, the chain or belt may skip a tooth, causing unacceptable engine operation or, in extreme cases, engine damage. If, on the other hand tension within the belt or chain is too great, excessive wear will occur within engine bearings such as crankshaft main bearings or camshaft bearings.

It is known to construct a chain tensioner, for driving a camshaft of an internal combustion engine, with the tensioning force being provided by a piston which is pressurized by engine lubricating oil. Such devices usually employ a controlled leakage factor to exert a force of appropriate magnitude upon a tensioner shoe in the direction tending to tension the chain properly, while damping out excess oscillations of the chain. Such tensioners also typically include a ratcheting device which prevents the tensioner shoe from releasing from the chain beyond a predetermined amount when oil pressure drops off, as when the engine is shut down. Unfortunately, such known devices are prone to overextension of the ratcheting tensioner device during startup operating at lower ambient temperatures, which may cause the ills described above as accompanying excess tension in the chain.

It would be desirable to provide a tensioner which not only prevents excessive falloff in chain tension when the engine is shut down, but which also prevents overtightening or overtensioning of a chain or belt during operation of the engine.

SUMMARY OF THE INVENTION

According to an aspect of the present invention, a hydraulic tensioner for a drive system having a flexible, inextensible drive element, includes a tensioner shoe in contact with the drive element, a hydraulically biased tensioning cylinder for loading the tensioner shoe so as to maintain a desired tension in the drive element, and a bi-directional travel limiter, operatively associated with the tensioning cylinder, and with the tensioner shoe, for not only limiting loading of the tensioning cylinder against the tensioner shoe in a direction tending to tighten the drive element, but also resisting movement of the tensioner shoe in a direction tending to allow slack in the drive element.

According to another aspect of the present invention, a bi-directional travel limiter includes a lockable plunger extending parallel to an axis of motion of the tensioning cylinder, with the bi-directional travel limiter having a cam mechanism for locking the lockable plunger. The cam mechanism, according to an aspect of the present invention, includes a pivoted cam having a resilient biasing element for positioning the cam so as to prevent the lockable plunger from moving in a direction tending to allow slack in a drive element, as well as a hydraulically actuated biasing element for positioning the cam so as to lock the lockable plunger, thereby preventing the tensioning cylinder from moving more than a predetermined distance in a direction tending to tighten the drive element.

According to another aspect of the present invention, a tensioning cylinder and a hydraulically actuated biasing element are driven by pressurized oil from a hydraulic pressure source, such as an oil pump in an engine lubrication system.

According to another aspect of the present invention, a hydraulically actuated biasing element includes a piston slidably mounted within a bore connected with a hydraulic pressure source, with the piston having an end portion for contacting the pivoted cam, so as to rotate the pivoted cam to a position in which the lockable plunger prevents the tensioning cylinder from moving more than a predetermined distance in a direction tending to tighten the drive element, which may be either a metal chain, or a composite elastomer belt.

According to another aspect of the present invention, a hydraulically actuated biasing element includes a piston slidably mounted within the bore connected with a source of pressurized oil having a greater viscosity when cold and a lesser viscosity when hot. In this manner, the bi-directional travel limiter will limit the loading of the tensioning cylinder against the tensioner shoe in a direction tending to tighten the drive element when an operating parameter of the hydraulic tensioner exceeds a predetermined value.

It is an advantage of a hydraulic tensioner with an overtravel limiter according to the present invention that inappropriate tensioning of a drive chain, which may otherwise occur when lubricating oil is extremely viscous, as during a cold weather startup, will be prevented.

It is another advantage of a hydraulic tensioner according to the present invention that damage resulting to an engine's crankshaft and camshaft and other ancillary equipment, particularly bearings, will be prevented because excessive tension of a flexible, inextensible drive element extending between a crankshaft and a camshaft will be prevented.

It is yet another advantage of a device according to the present invention that this device may be employed in conjunction with known tensioning equipment to prevent damage due to excessive tension arising from over-extension of a tensioner.

Other advantages, as well as features of the present invention, will become apparent to the reader of this specification.

DETAILED DESCRIPTION OF THE PREFERRED EMBODIMENTS

Figure 1:
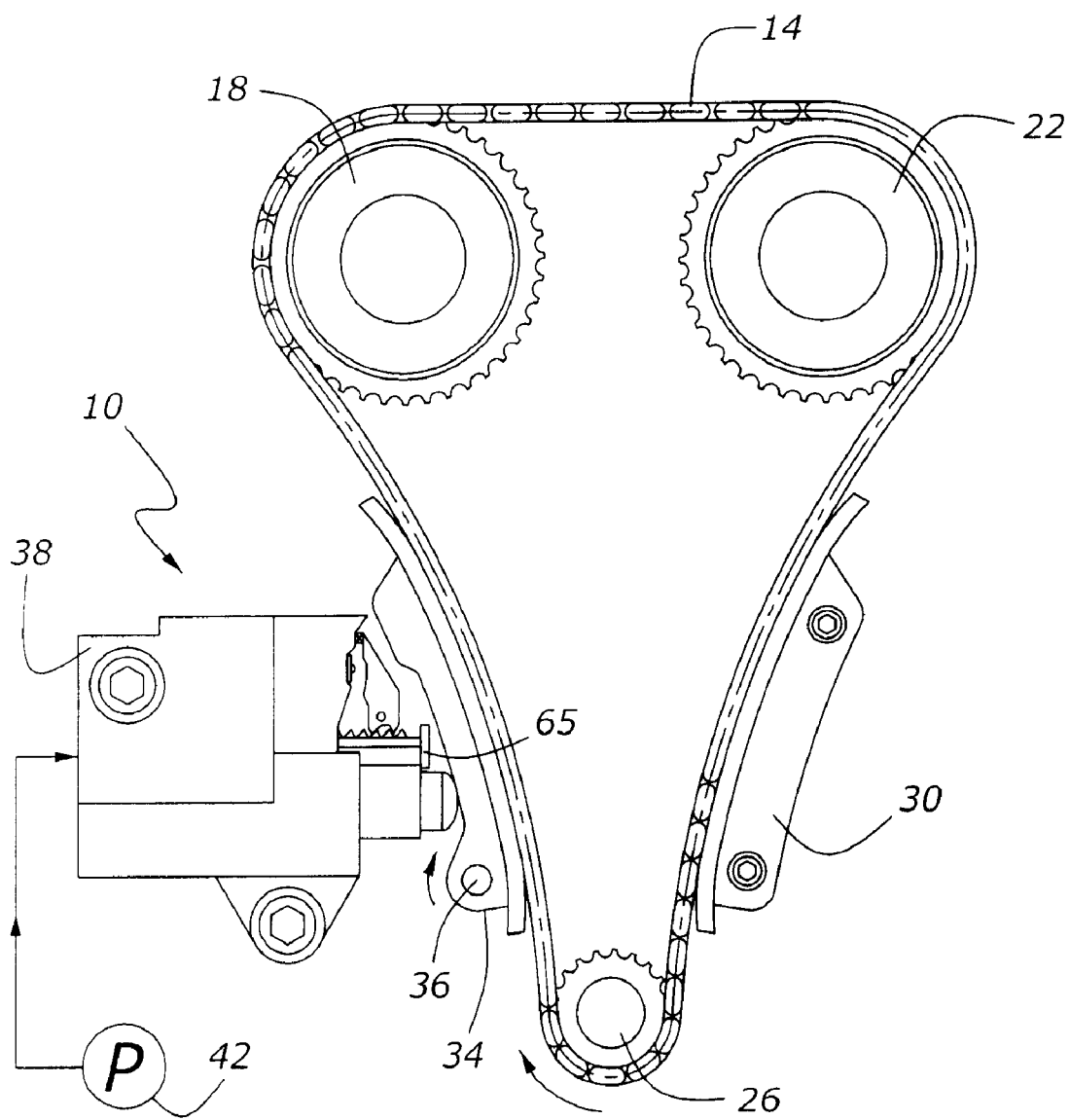
FIG. 1 is a schematic representation of an engine crankshaft, camshafts and drive system according to an aspect of the present invention.

As shown in FIG. 1, hydraulic tensioner 10 for a drive system is used with a flexible, inextensible drive element such as a chain or belt, 14. In the arrangement shown in FIG. 1, two camshafts, 18 and 22, are driven by a crankshaft, 26. Chain or belt 14 is trained over sprockets or pulleys attached to both crankshaft 26 and camshafts 18 and 22. Tension within flexible, inextensible drive element 14 is maintained by a nonadjustable guide shoe 30, as well as by a tensioner shoe 34. Tensioner shoe 34 is pivotably attached to the engine by a pivot, 36. Tensioner 10 pushes tensioner shoe 34 into drive element 14, so as to maintain the required tension within drive element 14. Tensioner 10 is furnished with engine oil under pressure from pump 42, which, in a preferred embodiment, is the engine's lubricating oil pump. Those skilled in the art will appreciate in view of this disclosure however, that other types of oil pumps could be used for the purpose of providing hydraulic oil under pressure to hydraulic tensioner 10.

Figure 2:
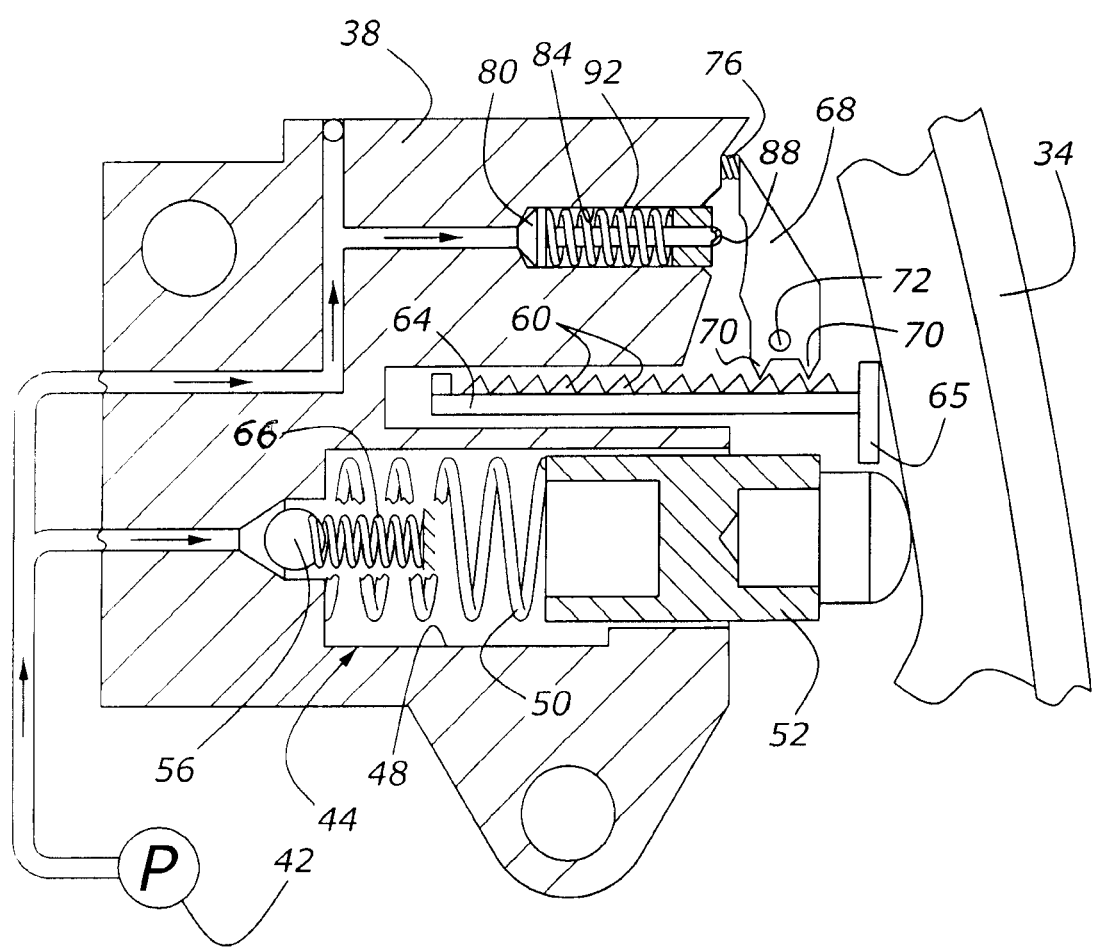
FIG. 2 is an enlarged view, partially schematic, of a portion of the hydraulic tensioner shown in FIG. 1.
Figure 3:
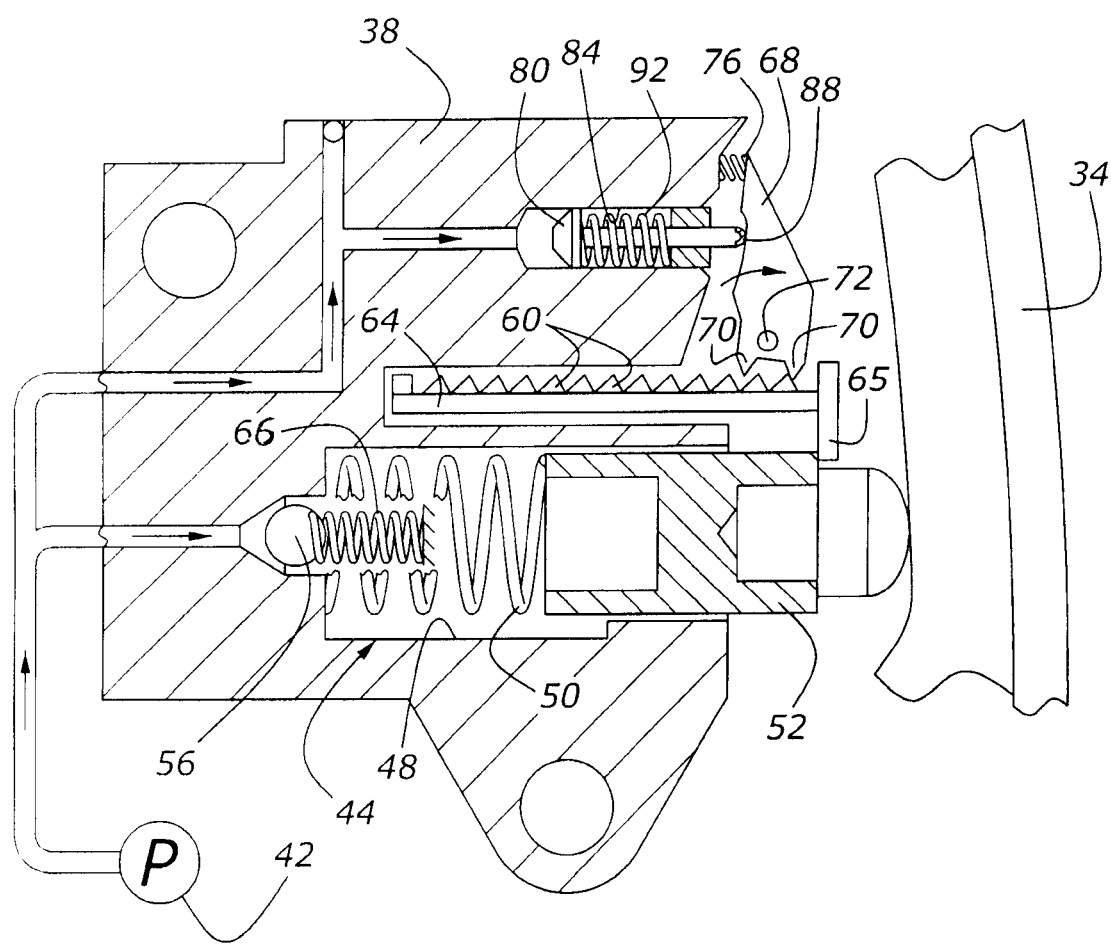
FIG. 3 is similar to FIG. 2, but shows the inventive tensioner during cold startup operation.

Moving now to FIGS. 2 and 3, tensioner 10 is shown as including a hydraulically biased tensioning cylinder, configured as piston 52 housed reciprocably within bore 48, and having a check ball 56 and bias spring 66 at the inlet to bore 48, to prevent unnecessary bleed back of oil within bore 48, and also having a spring, 50, for biasing piston 52 into tensioner shoe 34 in a direction tending to tension drive element 14.

In addition to piston 52, a bi-directional travel limiter also exerts various forces upon tensioner shoe 34. The bi-directional travel limiter includes a lockable plunger 64, having a number of teeth 60 formed thereupon. Lockable plunger 64 has a head, 65, which selectively engages piston 52 and also which engages tensioner shoe 34. When lockable plunger 64 is rendered immovable by the remainder of hydraulic tensioner 10, which will be explained below in conjunction with FIG. 3, lockable plunger 64 will not only prevent tensioner shoe 34 from moving backwardly in a direction tending to allow more slack within drive element 14, but will also prevent piston 52 from moving outwardly from bore 48, and thereby applying too much tension to drive element 14 through the force imposed by tensioner shoe 34 upon drive element 14. If piston 52 collapses too far, head 65 of plunger 64 will contact tensioner shoe 34, thereby preventing excessive slack in drive element 14.

Tensioner housing 38, in addition to hydraulically biased tensioning cylinder 44, includes an additional bore 84, which is exposed to oil pressure from oil pump 42. Piston 80 is housed within bore 84, and engine oil pressure tends to force piston 80 from bore 84 so that end portion 88 of piston 80 impinges upon a pivotable cam, 68 (FIG. 3). When piston 80, and more specifically, end portion 88 of piston 80, impinges upon pivotable cam 68, cam 68 will pivot about cam pivot 72, and teeth 70 of cam 68 will engage teeth 60 provided on lockable plunger 64. This engagement of piston 80 with pivotable cam 68 may occur when an engine having the present system is operated at initial startup at a low ambient temperature, because such operation is often characterized by very high engine oil pressure. As a result, the viscosity of the oil is great and extremely high lubrication oil pressures are the rule. These pressures could cause piston 52 to place excessive stress upon shoe 34 and drive element 14, but for the intervention provided by the present inventive mechanism. In any event, when the engine warms up, a return spring, 92, which is also housed within bore 84 pulls piston 80 back from its engagement with pivotable cam 68, and thereby unlocks lockable plunger 64 (FIG. 2). This will allow lockable plunger 64 to move forward and into contact with shoe 34. At the same time, piston 52 will be allowed to move forward and, backward movement of lockable plunger 64 will be prevented by resilient biasing element 76, and pivotable cam 68, which prevent travel of lockable plunger 64 in a direction tending to cause more slack in chain or belt 14, while allowing lockable plunger 64 to move outwardly, so as to desirably maintain tension within drive element 14 when the engine has been shut down.

Figure 4:
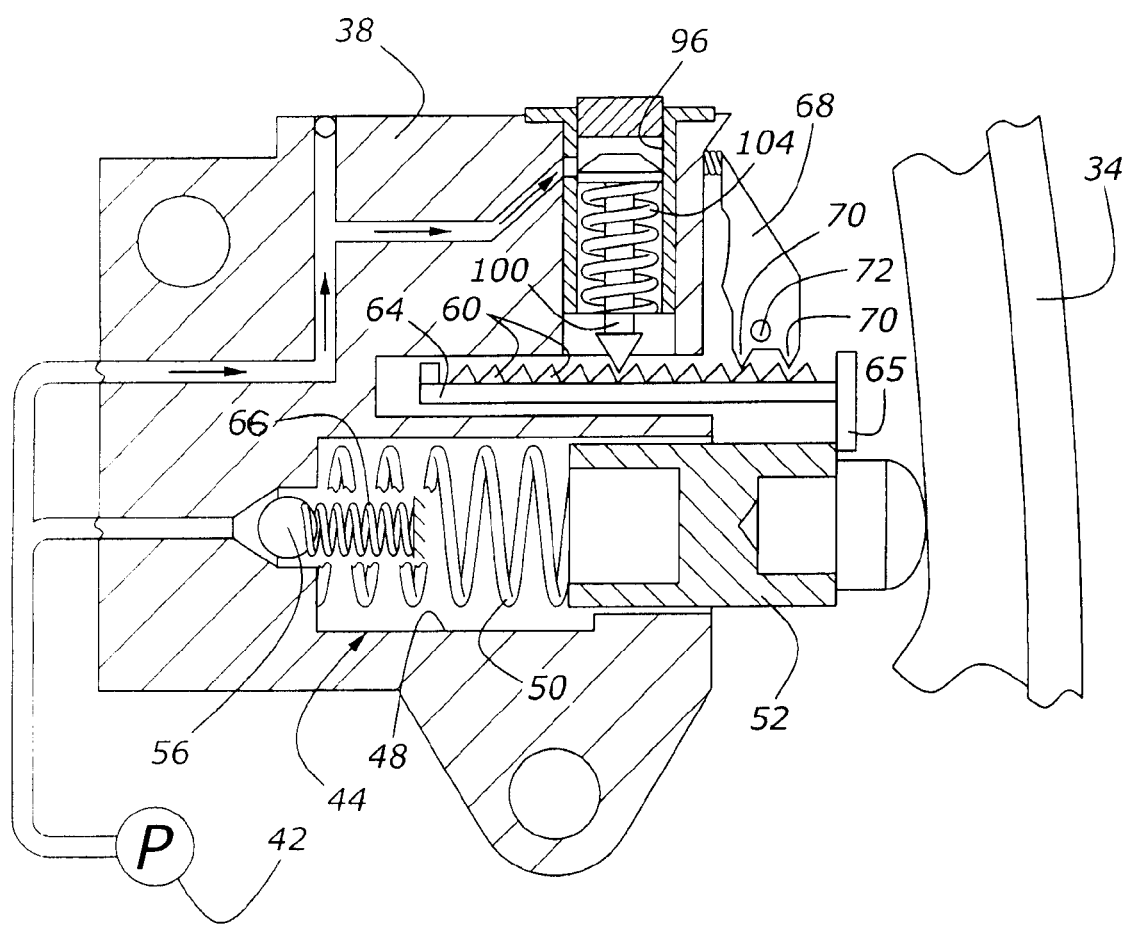
FIG. 4 illustrates an alternative embodiment according to an aspect of the present invention, in which a direct-acting, hydraulically driven pawl prevents unwanted drive element tensioning.

FIG. 4 illustrates an alternative embodiment according to an aspect of the present invention, in which a direct-acting, hydraulically driven pawl, 100, which is slidably mounted within a bore, 96, formed within housing 38 prevents unwanted drive element tensioning by immobilizing lockable plunger 64 whenever the pressure of lubricating oil within bore 96 exceeds the pullback force provided by spring 104.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A hydraulic tensioner for a drive system having a flexible, inextensible, drive element, with said tensioner comprising:
   a tensioner shoe in contact with the drive element;
   a hydraulically biased tensioning cylinder for loading the tensioner shoe so as to maintain a desired tension in the drive element; and
   a bi-directional travel limiter, operatively associated with said tensioning cylinder and with said tensioner shoe, for not only limiting loading of said tensioning cylinder against the tensioner shoe in a direction tending to tighten said drive element, but also resisting movement of the tensioner shoe in a direction tending to allow slack in the drive element.

2. A hydraulic tensioner according to claim 1, wherein said bi-directional travel limiter comprises a lockable plunger extending parallel to an axis of motion of said tensioning cylinder.

3. A hydraulic tensioner according to claim 2, wherein said bi-directional travel limiter further comprises a cam mechanism for locking said lockable plunger.

4. A hydraulic tensioner according to claim 3, wherein said cam mechanism comprises a pivoted cam having a resilient biasing element for positioning the cam so as to prevent the lockable plunger from moving in a direction tending to allow slack in the drive element, and a hydraulically actuated biasing element for positioning the cam so as to lock the lockable plunger, thereby preventing the tensioning cylinder from moving more than a predetermined distance in a direction tending to tighten the drive element.

5. A hydraulic tensioner according to claim 4, wherein said tensioning cylinder and said hydraulically actuated biasing element are driven by pressurized oil from a hydraulic pressure source.

6. A hydraulic tensioner according to claim 4, wherein said hydraulic pressure source comprises an engine lubrication system.

7. A hydraulic tensioner according to claim 4, wherein said hydraulically actuated biasing element comprises a piston slidably mounted within a bore connected with a hydraulic pressure source, with said piston having an end portion for contacting the pivoted cam, so as to rotate the pivoted cam to a position in which the lockable plunger prevents the tensioning cylinder from moving more than a predetermined distance in a direction tending to tighten the drive element.

8. A hydraulic tensioner according to claim 4, wherein said hydraulically actuated biasing element comprises a piston slidably mounted within a bore connected with a source of pressurized oil having a greater viscosity when cold and a lesser viscosity when hot.

9. A hydraulic tensioner according to claim 4, wherein said hydraulically actuated biasing element comprises a piston slidably mounted within a bore connected with a hydraulic pressure source, with the piston having an end portion for contacting the pivoted cam, and a resilient element tending to move the piston in a direction away from the cam.

10. A hydraulic tensioner according to claim 1, wherein the bi-directional travel limiter limits loading of the tensioning cylinder against the tensioner shoe in a direction tending to tighten the drive element when an operating parameter of the hydraulic tensioner exceeds a predetermined value.

11. A hydraulic tensioner according to claim 10, wherein said operating parameter comprises the viscosity of a hydraulic oil furnished to said tensioner.

12. A hydraulic tensioner according to claim 1, wherein the flexible, inextensible, drive element comprises a chain.

13. A hydraulic tensioner for an internal combustion engine accessory drive system having a flexible, inextensible, drive element, with said tensioner comprising:
   a tensioner shoe in contact with the drive element;
   a hydraulically biased tensioning cylinder for loading the tensioner shoe so as to maintain a desired tension in the drive element; and
   a bi-directional travel limiter, comprising a lockable plunger operatively associated with said tensioning cylinder and with said tensioner shoe, for not only selectively limiting loading of said tensioning cylinder against the tensioner shoe in a direction tending to tighten said drive element, but also resisting movement of the tensioner shoe in a direction tending to allow slack in the drive element.

14. A hydraulic tensioner according to claim 13, wherein said bi-directional travel limiter further comprises a hydraulically pivotable cam for selectively locking the lockable plunger, thereby preventing the tensioning cylinder from moving more than a predetermined distance in a direction tending to tighten the drive element.

15. A hydraulic tensioner according to claim 14, wherein said lockable plunger is locked when the viscosity of oil driving a hydraulically actuated biasing element connected to the cam exceeds a predetermined value.

16. A hydraulic tensioner according to claim 14, wherein said lockable plunger is locked when the viscosity of oil driving both the hydraulically pivotable cam and the tensioning cylinder exceeds a predetermined value.

17. A hydraulic tensioner according to claim 14, wherein the hydraulically pivotable cam and the tensioning cylinder are provided with oil under pressure from a lubrication system of the engine.

18. A hydraulic tensioner according to claim 14, wherein the bi-directional travel limiter selectively limits loading of the tensioning cylinder against the tensioner shoe when the viscosity of hydraulic oil furnished to the tensioner is greater than a predetermined value.

19. A hydraulic tensioner according to claim 14, further comprising an oil pump for furnishing lubricating oil under pressure to said hydraulically pivotable cam and to said tensioning cylinder.

20. A hydraulic tensioner according to claim 13, wherein said bi-directional travel limiter further comprises a hydraulically lockable pawl for selectively locking the lockable plunger, thereby preventing the tensioning cylinder from moving more than a predetermined distance in a direction tending to tighten the drive element.

\* \* \* \* \*